(12) United States Patent
Hashimoto et al.

(10) Patent No.: US 11,754,879 B2
(45) Date of Patent: Sep. 12, 2023

(54) LIGHT SOURCE DEVICE

(71) Applicant: NICHIA CORPORATION, Anan (JP)

(72) Inventors: Toshiyuki Hashimoto, Anan (JP); Shimpei Sasaoka, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/741,063

(22) Filed: May 10, 2022

(65) Prior Publication Data

US 2022/0269137 A1 Aug. 25, 2022

Related U.S. Application Data

(63) Continuation of application No. 17/172,991, filed on Feb. 10, 2021, now Pat. No. 11,372,286, which is a continuation of application No. 16/811,880, filed on Mar. 6, 2020, now Pat. No. 10,948,775.

(30) Foreign Application Priority Data

Mar. 8, 2019 (JP) ................................. 2019-042718
Feb. 19, 2020 (JP) ................................. 2020-025979

(51) Int. Cl.
*G02F 1/13357* (2006.01)
*B60K 35/00* (2006.01)

(52) U.S. Cl.
CPC .. *G02F 1/133611* (2013.01); *G02F 1/133603* (2013.01); *G02F 1/133605* (2013.01); *G02F 1/133608* (2013.01); *B60K 35/00* (2013.01); *B60K 2370/332* (2019.05)

(58) Field of Classification Search
CPC ......... G02F 1/133611; G02F 1/133603; G02F 1/133605; G02F 1/133607; G02F 1/133614; G02F 2202/28; H01L 33/60
See application file for complete search history.

(56) References Cited

U.S. PATENT DOCUMENTS

| | | |
|---|---|---|
| 7,753,563 B2 | 7/2010 | Parker |
| 8,789,959 B2 | 7/2014 | Shimizu |
| 8,950,884 B2 | 2/2015 | Stevens et al. |
| 9,714,746 B2 | 7/2017 | Tischler et al. |
| 10,400,991 B2 | 9/2019 | Ohkawa |

(Continued)

FOREIGN PATENT DOCUMENTS

| | | |
|---|---|---|
| CN | 103851361 B | 11/2015 |
| JP | 2004-231737 A | 8/2004 |

(Continued)

OTHER PUBLICATIONS

English Translation, WO 2012/029686, Mar. 8, 2012, Namekata (Year: 2012).*

(Continued)

*Primary Examiner* — Peggy A Neils
(74) *Attorney, Agent, or Firm* — Global IP Counselors, LLP

(57) ABSTRACT

A light source device includes a plurality of light sources, a substrate on which the light sources are arranged, and a reflective member arranged on the substrate via an adhesive member. The reflective member defines a plurality of through holes. The light sources are respectively disposed inside the through holes in a plan view. The adhesive member is light-reflective.

11 Claims, 6 Drawing Sheets

(56) References Cited

U.S. PATENT DOCUMENTS

| | | |
|---|---|---|
| 10,451,921 B2 | 10/2019 | Mifune |
| 2006/0244879 A1 | 11/2006 | Yoon et al. |
| 2010/0231804 A1 | 9/2010 | Hisakawa |
| 2014/0056003 A1 | 2/2014 | Frattalone |
| 2014/0140046 A1 | 5/2014 | Ono et al. |
| 2015/0029439 A1* | 1/2015 | Kim .................. G02F 1/133605 349/64 |
| 2017/0030549 A1 | 2/2017 | Kamada et al. |
| 2017/0103972 A1 | 4/2017 | Yamada et al. |
| 2019/0094616 A1 | 3/2019 | Kim et al. |
| 2019/0243172 A1 | 8/2019 | Gotou |
| 2019/0285246 A1 | 9/2019 | Yamamoto et al. |

FOREIGN PATENT DOCUMENTS

| | | | |
|---|---|---|---|
| JP | 2006-310319 A | 11/2006 | |
| JP | 2013-025945 A | 2/2013 | |
| JP | 2015-230760 A | 12/2015 | |
| JP | 2018-056367 A | 4/2018 | |
| JP | 6407458 B | 9/2018 | |
| JP | 2018-206553 A | 12/2018 | |
| JP | WO2018124012 A1 | 12/2018 | |
| WO | 2009054177 A1 | 4/2009 | |
| WO | WO 2012/029686 * | 3/2012 | ................ F21S 2/00 |
| WO | 2018221657 A1 | 12/2018 | |

OTHER PUBLICATIONS

Non Final Office Action in the related U.S. Appl. No. 16/811,880, dated Sep. 23, 2020.

Notice of Allowance in the related U.S. Appl. No. 16/811,880, dated Nov. 13, 2020.

Non Final Office Action in the related U.S. Appl. No. 17/172,991, dated Sep. 22, 2021.

Notice of Allowance in the related U.S. Appl. No. 17/172,991, dated Feb. 18, 2022.

* cited by examiner

LIGHT SOURCE DEVICE

CROSS-REFERENCE TO RELATED APPLICATION

This is a continuation application of U.S. patent application Ser. No. 17/172,991, filed on Feb. 10, 2021, which is a continuation application of U.S. patent application Ser. No. 16/811,880 filed on Mar. 6, 2020, now U.S. Pat. No. 10,948,775. This application claims priority to Japanese Patent Application No. 2019-042718, filed on Mar. 8, 2019, and Japanese Patent Application No. 2020-025979, filed on Feb. 19, 2020. The entire disclosures of U.S. patent application Ser. Nos. 17/172,991 and 16/811,800 and Japanese Patent Application Nos. 2019-042718 and 2020-025979 are hereby incorporated herein by reference.

BACKGROUND

The present disclosure relates to a light source device.

Surface-emitting light source device are known as a direct-illumination backlight used in liquid crystal televisions, in-vehicle instruments, or the like. An example of the surface-emitting light source devices is described in Japanese Patent Publication No. 2013-25945. Such a light source device has frames arranged in a matrix shape, each of the frames having a reflective peripheral wall around a corresponding one of light sources. This structure provides divided light-emitting regions and prevents light leakage to the outside of the regions.

SUMMARY

However, particularly in in-vehicle instruments having an unevenly-shaped plane in a plan view, the light sources are not always arranged regularly at the outer periphery of the on-vehicle instruments. This may lead to unevenness of luminance in the plane. The present disclosure has been made in view of the above and has an object to provide a light source device, in the case in which the light source device has an unevenly-shaped plane, having a uniform luminance in the plane.

A light source device according to one aspect includes a plurality of light sources, a substrate on which the light sources are arranged, and a reflective member arranged on the substrate via an adhesive member. The reflective member defines a plurality of through holes. The light sources are respectively disposed inside the through holes in a plan view. The adhesive member is light-reflective.

The light source device according to certain embodiments of the present disclosure can provide, in the case in which the light source device has an unevenly-shaped plane, a uniform luminance in the plane.

DESCRIPTION

Figure 1A:
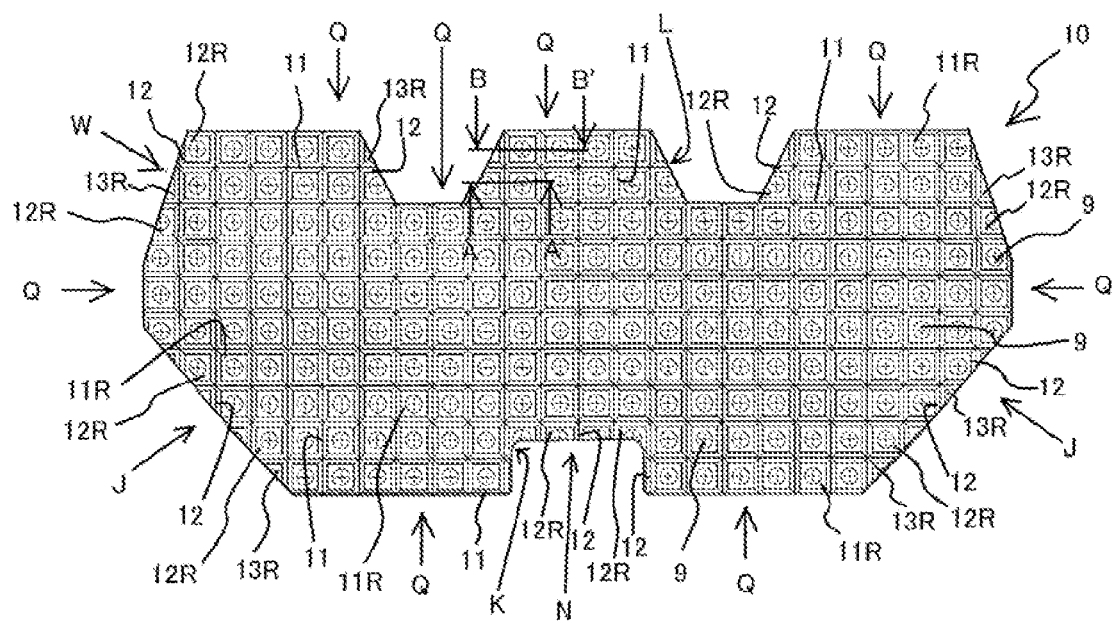
FIG. 1A is a schematic plan view of a light source device according to one embodiment of the present disclosure.
Figure 1B:
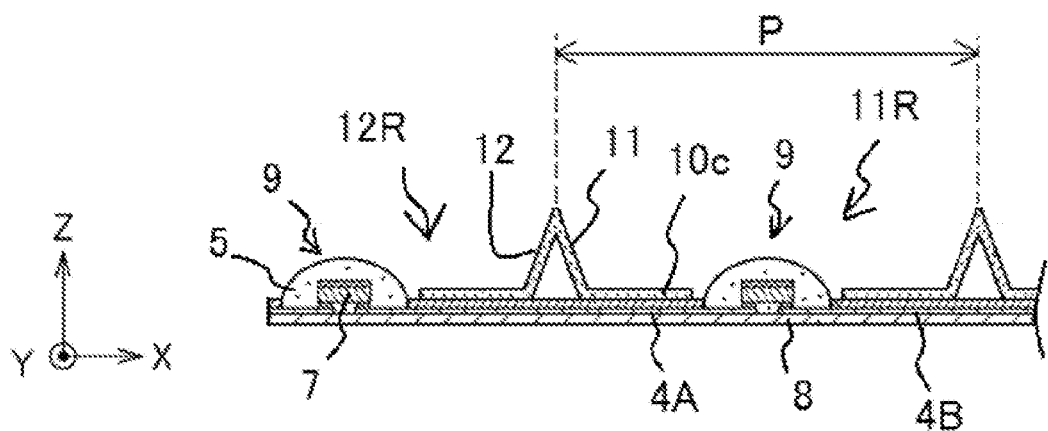
FIG. 1B is a schematic cross-sectional view taken along the line A-A' in FIG. 1A.
Figure 1C:
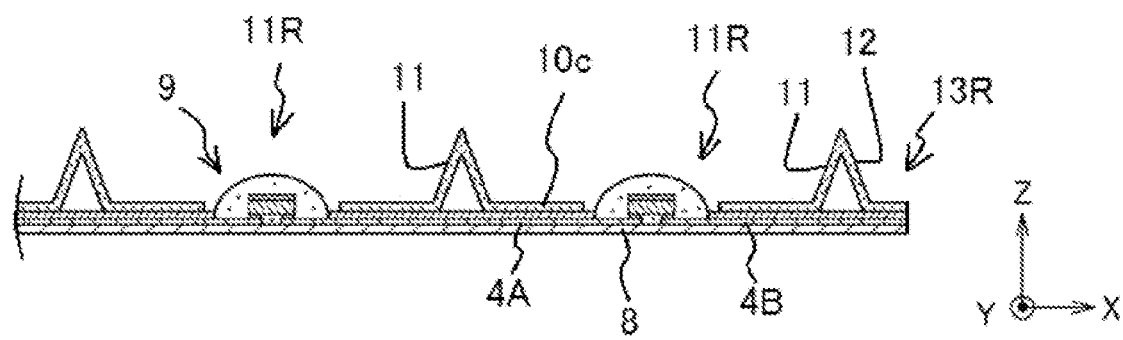
FIG. 1C is a schematic cross-sectional view taken along the line B-B' in FIG. 1A.

Embodiments of the present disclosure will be described below with reference to the accompanying drawings. The embodiments described below are intended to embody the technical idea of the present disclosure and are not intended to limit the present disclosure to the embodiments below unless specifically stated otherwise. Constitutions described regarding an embodiment or an example are applicable to other embodiments or examples. The sizes, positional relationships, and the like of members shown in the drawings can be exaggerated for clarity of descriptions.

In the present embodiment, a light extraction surface of a light source of a light source device can be referred to as an upper surface or an upside. Also, unless otherwise specified, in a plan view, the central part of each of the light source device, a substrate, and/or a reflective member can be referred to as an inner side. An opposite side of the inner side thereof can be referred to as an outer side.

As shown in FIGS. 1A through 1F, a light source device according to one embodiment of the present disclosure includes light sources 9, a substrate 8 on which the light sources are arranged, and a reflective member 10. Such a light source device serves as a surface-emitting light source device. The reflective member 10 includes one or more first walls 11 each surrounding a corresponding one of the light sources 9 and one or more second walls 12 that are located outside the first walls 11 and define at least one opening facing outside. The reflective member 10 includes first regions 11R each surrounded by the first walls 11, second regions 12R surrounded by the second walls 12, and third regions 13R surrounded by the second walls 12. The second regions 12R each have at least a half of an area of the first region 11R. The third regions 13R each have an area less than half of the area of the first region 11R. The light source 9 is disposed in the second region 12R and not disposed in the third region 13R.

Even in the case in which the light source device has an unevenly-shaped plane, this configuration can provide a uniform luminance in the plane.

Light Source 9

Figure 3A:
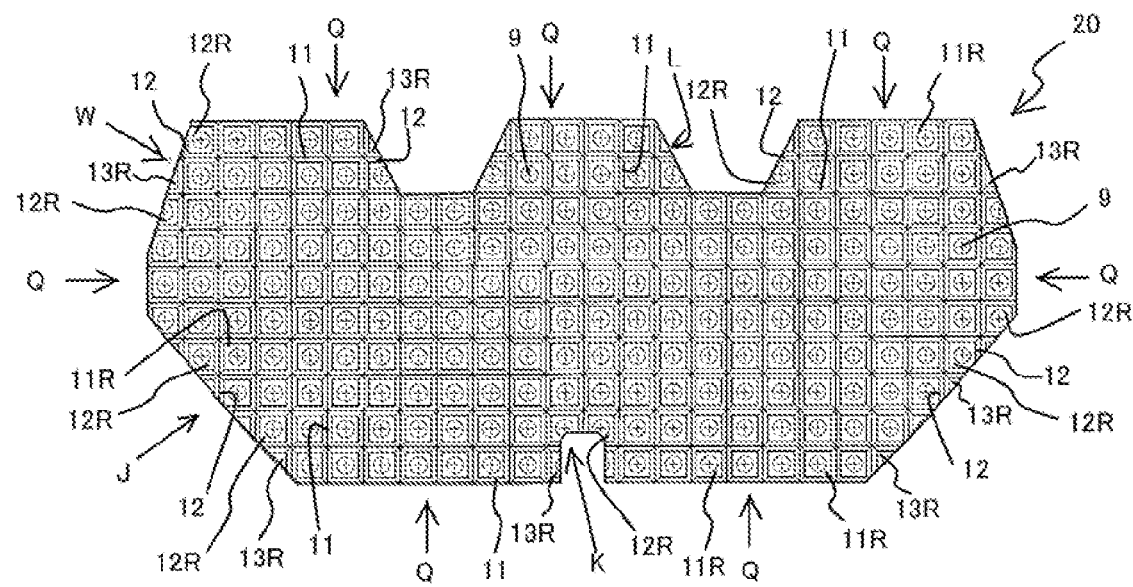
FIG. 3A is a schematic plan view of a light source device according to another embodiment of the present disclosure.
Figure 3B:
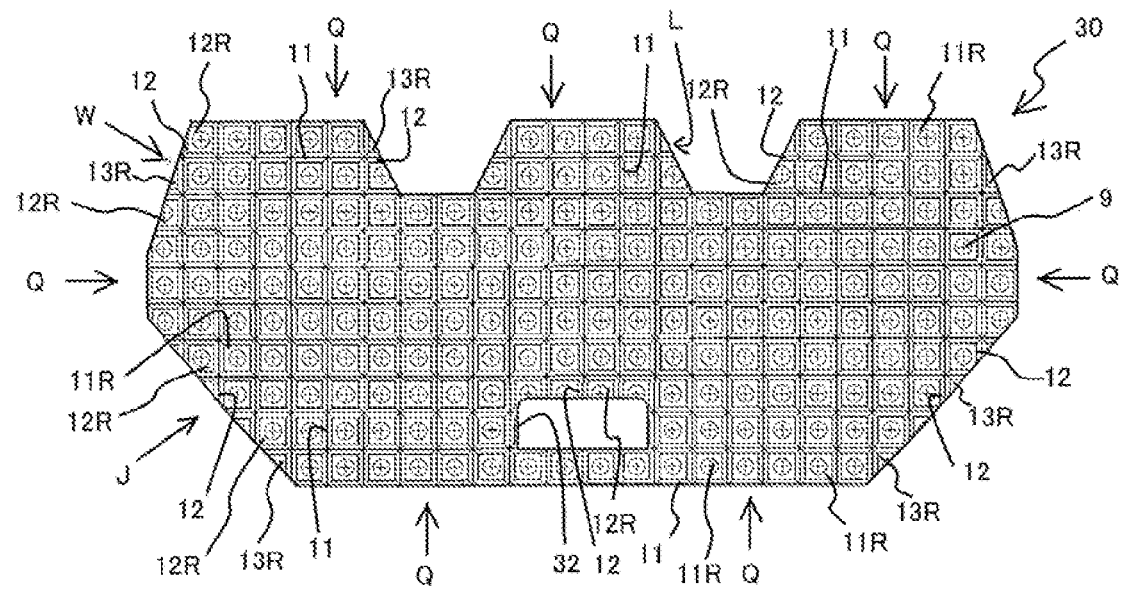
FIG. 3B is a schematic plan view of a light source device according to still another embodiment of the present disclosure.
Figure 3C:
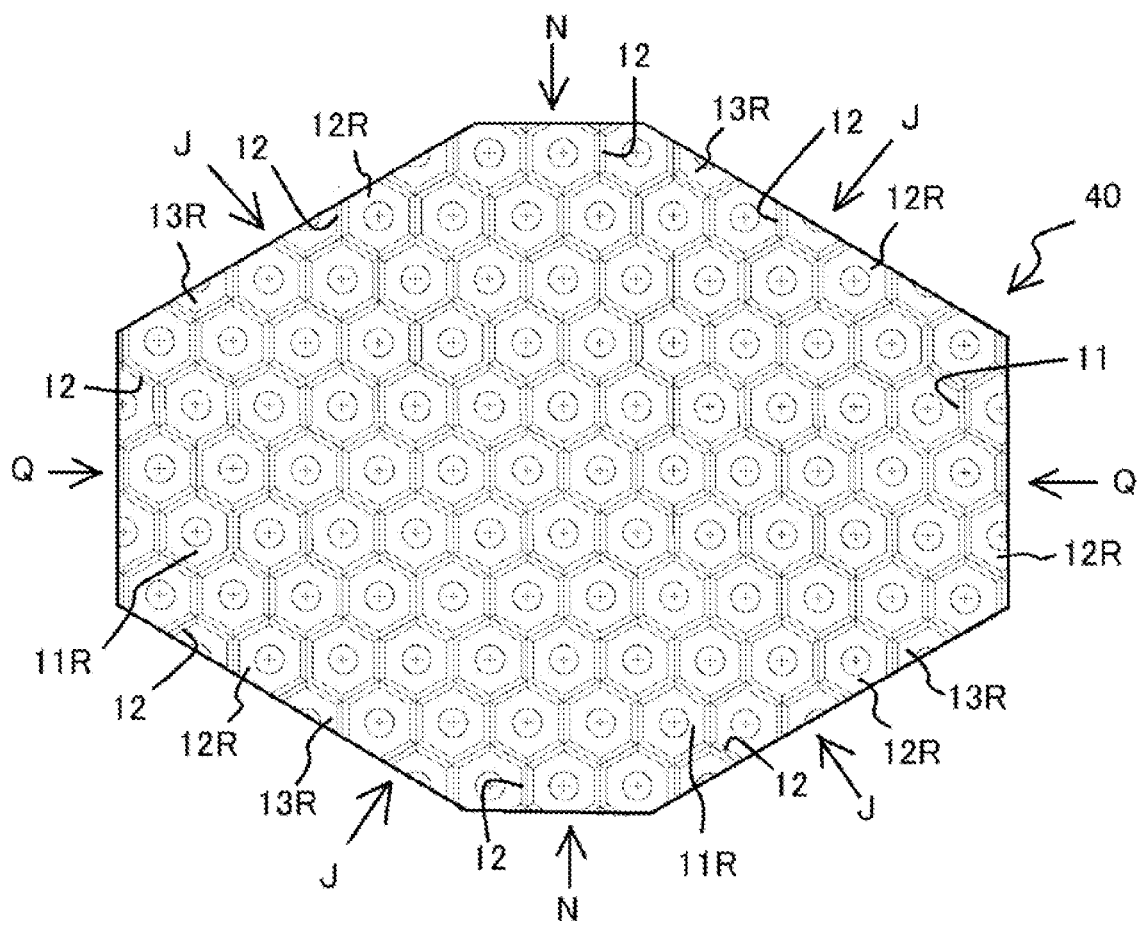
FIG. 3C is a schematic plan view of a light source device according to still another embodiment of the present disclosure.

The light source 9 is a light-emitting member. Examples of the light source 9 include a light-emitting element that emits light by itself, a light-emitting element encapsulated by a light-transmissive resin and the like, and a surface mounted light-emitting device (LED) in which a light-emitting element is packaged. The light sources 9 are preferably regularly arranged on the substrate 8 in parallel, for example, vertically and laterally, in columns and rows, and in a matrix shape. This configuration can provide a uniform luminance in the plane. That is, the light sources 9 are preferably regularly arranged in columns and rows as shown in FIG. 1A. As shown in FIG. 3C, the light sources 9 can be arranged regularly in the row direction, and in the column direction, such that each of the light sources 9 is regularly disposed in parallel to and disposed between the adjacent rows of the light sources 9, while being shifted by half the length of the light source 9 in the row direction.

Figure 2A:
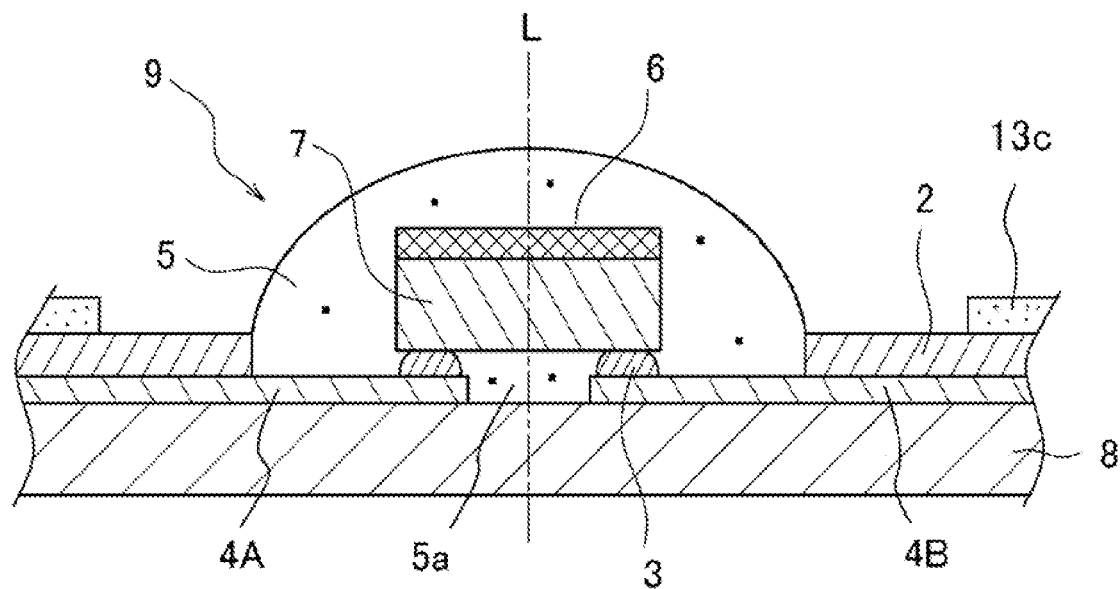
FIG. 2A is a schematic partial enlarged cross-sectional view around a light-emitting element of the light source device in FIG. 1A.

An example of the light source 9 includes a light-emitting element 7 covered by an encapsulating member 5 as shown in FIG. 2A. A single light-emitting element 7 can be used for the light source 9. Alternatively, a plurality of light-emitting elements 7 can be used as a single light source.

Figure 2B:
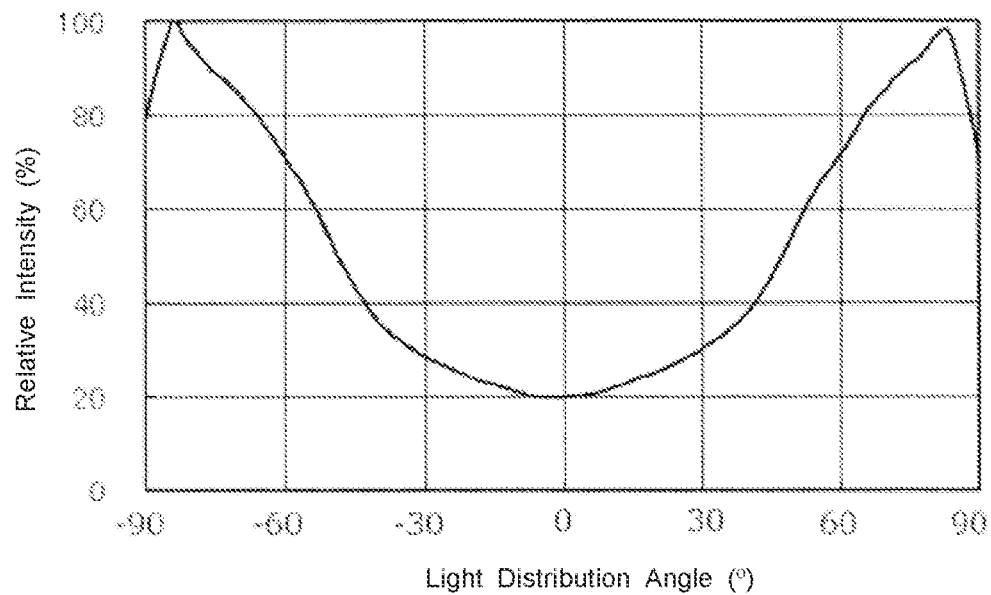
FIG. 2B is a graph illustrating a batwing light distribution characteristic of a light-emitting element of the light source device in FIG. 1A.

The light source 9 can have any light distribution characteristic, however, the light source 9 preferably has a wide light distribution to reduce unevenness in luminance in each region that is surrounded by walls of the reflective member 10 that will be described later. Particularly, each light source 9 preferably has a batwing light distribution characteristic as shown in FIG. 2B. This can reduce the amount of light emitted directly upward from the light source 9 and broaden light distribution of each light source, so that the broadened light is reflected by the reflective member 10. Accordingly, unevenness in luminance in each region that is surrounded by the walls can be reduced.

Herein, the "batwing light distribution characteristic" is defined by assuming an optical axis L to be zero degrees, and a light distribution characteristic having an emission intensity distribution in which the emission intensity at distribution angles at absolute values larger than zero degrees is greater than the emission intensity at zero degree. As shown in FIG. 2A, the "optical axis L" is defined as an axis that passes through the center of the light source 9 and vertically intersects with a plane configuring an upper surface of the substrate 8, which will be described later.

Particularly, an example of the light source 9 having a batwing light distribution characteristic includes a light-emitting element 7 that includes a light-reflective film 6 on the upper surface of the light-emitting element 7 as shown in FIG. 2A. This allows light emitted upward from the light-emitting element 7 to be reflected by the light-reflective film 6 and reduces the amount of light emitted directly upward from the light-emitting element 7. Thus, the batwing light distribution characteristic can be obtained. As the light-reflective film 6 can be formed directly on the light-emitting element 7, the assembling of a special lens for achieving the batwing light distribution characteristic is not needed. This allows the light source 9 to have a reduced thickness.

The light-reflective film 6 formed on the upper surface of the light-emitting element 7 can be any of a metal film formed using silver, or copper, or a dielectric multilayer (distributed Bragg reflector: DBR) film, or a combination of these films. The light-reflective film 6 preferably has incident angle dependence of reflectance for a light emission wavelength of the light-emitting element 7. Specifically, the light-reflective film 6 preferably has a lower reflectance with respect to a light incident in an oblique direction than a reflectance thereof with respect to a light incident in a perpendicular direction. This configuration can inhibit unevenness in luminance directly above the light-emitting element, and thus inhibit noticeable darkness such as a dark spot directly above the light-emitting element.

The light source 9 includes, for example the light-emitting element 7 mounted directly on the substrate and having a height in a range of 100 µm to 500 µm. The light-reflective film 6 has a thickness in a range of 0.1 µm to 3.0 µm. The light source 9 including the encapsulating member 5 (described later), can have a thickness in a range of 0.5 mm to 2.0 mm.

Preferably, the light sources 9 are mounted on the substrate 8 (described later) such that the light sources 9 can be driven separately from one another, and light control such as local dimming or high dynamic range (HDR) can be performed for each light source.

Light-Emitting Element 7

A known element can be used for the light-emitting element 7. For example, a light-emitting diode can preferably be used for the light-emitting element. A light-emitting element that emits light having appropriately selected wavelength can be used. Examples of a blue or green light-emitting element include a light-emitting element including a nitride semiconductor. For a red light-emitting element, GaAlAs, AlInGaP, or the like can be used. Further, a semiconductor light-emitting element made of a material other than the above materials can also be used. The composition, emission color, size, and number of the light-emitting elements to be used can be selected appropriately depending on the purpose.

The light-emitting element 7 can be flip-chip mounted via bonding members 3 so as to straddle the gap between a pair of positive and negative wiring layers 4A and 4B that are disposed on the upper surface of the substrate 8 as shown in FIG. 2A. The light-emitting element 7 can be face-up mounted as well as flip-chip mounted. The bonding members 3 are configured to fix the light-emitting element 7 to the substrate or conductor wiring. The bonding member 3 can be an insulating resin or an electrically conductive member. For a flip-chip mounted light-emitting element, an electrically conductive member is used as shown in FIG. 2A. Examples of the bonding members 3 include Au-containing alloys, Ag-containing alloys, Pd-containing alloys, In-containing alloys, Pb—Pd-containing alloys, Au—Ga-containing alloys, Au—Sn-containing alloys, Sn-containing alloys, Sn—Cu-containing alloys, Sn—Cu—Ag-containing alloys, Au—Ge-containing alloys, Au—Si-containing alloys, Al-containing alloys, Cu—In-containing alloys, and mixtures of metals and fluxes.

Encapsulating Member 5

The encapsulating member 5 covers the light-emitting element to protect against external environments and to optically control light exiting from the light-emitting element. The encapsulating member 5 is formed of a light-transmissive material. Examples of the light-transmissive material include a light-transmissive resin such as an epoxy resin, a silicone resin, and a combination of these resins, and glass. Among these materials, a silicone resin is preferably used in consideration of light resistance and ease of molding. The encapsulating member 5 can contain a wavelength conversion material, light diffusing agent and/or a colorant. The wavelength conversion material can be a phosphor that absorbs light emitted from the light-emitting element to emit light that has a different wavelength from the light emitted from the light-emitting element. The diffusing agent diffuses light emitted from the light-emitting element. The colorant can be one corresponding to an emission color of the light-emitting element.

The phosphor, the diffuser, and the colorant known in the field of the disclosure can be used.

The encapsulating member 5 can be directly in contact with the substrate 8.

Viscosity of the encapsulating member 5 is adjusted to be able to be printed or applied by using a dispenser, and can be cured by heat treatment and light irradiation. Examples of shapes of the encapsulating member 5 include a substantially hemispherical shape. The substantially hemispherical shape includes a vertically-long protruding shape in a cross-sectional view in which a length along the Z axis is longer than a length along the X axis in a cross-sectional view. The substantially hemispherical shape also includes a laterally-long protruding shape in a cross-sectional view in which a length along the X axis is longer than a length along the Z axis in a cross-sectional view.

The encapsulating member 5 can have a circular shape, and an oval shape in a top view.

The encapsulating member 5 can be disposed as an underfill 5a between the lower surface of the light-emitting element 7 and the upper surface of the substrate 8.

Substrate 8

The substrate 8 is a member on which the light sources 9 are disposed, and has the wiring layers 4A and 4B on the upper surface to supply electric power to the light source 9 (such as the light-emitting element 7) as shown in FIG. 2A. Regions of the wiring layers 4A and 4B that are not electrically connected is preferably covered with a covering member 2.

The substrate 8 can be made of any material that can electrically insulate and separate at least a pair of the wiring layers 4A and 4B. Examples of the materials include ceramics, resins, and composite materials. Examples of the ceramics include alumina, mullite, forsterite, glass ceramics, and nitride (for example, AlN) and carbide (for example, SiC) ceramics, and LTCC. Examples of resins include phenolic resins, epoxy resins, polyimide resins, BT resins, polyphthalamide (PPA), and polyethylene terephthalate (PET). Examples of composite materials include mixture of the above-mentioned resins and inorganic fillers such as glass fiber, $SiO_2$, $TiO_2$ or $Al_2O_3$, glass fiber reinforced resins (for example, glass epoxy resins), and metal substrates configuring an insulating layer on a metal member.

The substrate 8 can have an appropriate thickness and can be a flexible substrate that can be manufactured using a roll-to-roll manner or can be a rigid substrate. The rigid substrate can be a slim rigid substrate that is bendable.

The wiring layers 4A and 4B can be formed of electrically conductive members, and a material that is generally used for a wiring layer of a circuit board. A plated film, a light-reflective film or the like can be formed on a surface of the electrically conductive wiring.

The covering member 2 is preferably formed of an insulating material. Any materials described as examples for the substrate material can be used for the covering member 2. The covering member can be any of the above-mentioned resins that contain a white filler and the like to inhibit leakage or absorption of light and to increase light extraction efficiency of the light source device.

Reflective Member 10

The reflective member 10 includes the one or more first walls 11 that surround a corresponding one of the light sources 9, and the one or more second walls 12.

The first walls 11 are preferably disposed such that each light source 9 arranged on the substrate is located near the center (or the center of gravity) of the first walls 11, more preferably at the center (or the center of gravity) of the first walls 11. The first walls 11 can have a frame shape of polygons such as quadrilaterals or hexagons, circles, and ellipses in a plan view. Among these shapes, a quadrilateral grid as shown in FIG. 1A or a hexagonal grid as shown in FIG. 3C is preferable. Particularly, a square grid is more preferable. The first walls 11 define, a plurality of regions, in other words, the first regions 11R, having a predetermined shape by the walls having the frame shape as described above. The region that includes the light source 9 and is surrounded by the reflective member 10, in other words, an outline of the first region 11R that is defined by the first walls 11 can have a shape of a circle, an ellipse, a polygon such as a quadrilateral or a hexagon in a top view. Among these shapes, a polygon, particularly a quadrilateral is preferable. This configuration allows the light-emitting region to be divided into a desired number of sectors by the first walls 11 depending on the area of the light-emitting surface of the surface-emitting light source device. Hence, the light-emitting regions can be located in high density. The first regions 11R that are defined by the first walls 11 are preferably defined regularly. The number of the first regions 11R defined by the first walls 11 can be set desirably and can be adjusted as required depending on an intended size of the light source device. Some of the first regions 11R can have a different size and/or shape, however, all of the first regions 11R preferably have the same size and shape.

In other words, in the reflective member 10, the first walls 11 are preferably connected with each other and arranged in frame shapes such that the first regions 11R surrounding the respective light sources 9 are regularly arranged, for example, vertically and laterally, in columns and rows, or in a matrix shape.

The second walls 12 define one or more of, preferably a plurality of regions having a predetermined shape, in other words, the second region 12R and the third regions 13R. In the reflective member 10, the second walls 12 are disposed outside the first walls 11 and have an opening facing outside the reflective member 10, that is, outside the light source device. In other words, the second walls 12 define the second region 12R and the third region 13R, each of which is only partially surrounded by the second walls 12. The opening herein can be opened in a portion of a height direction of the second walls 12, however, preferably fully opened in the height direction of the second walls 12. The term "outside of the first walls" or "on an outer side of the first walls" refers to outside the first walls near an outer periphery of the reflective member 10 in a plan view as shown in FIG. 1A. In the case in which the reflective member 10 has a through hole 32 inside an outermost periphery in a plan view as shown in FIG. 3B, the term "outside of the first walls" or "on an outer side of the first walls" also refers to the through hole 32 sides of the first walls that are positioned near the through hole 32.

In other words, in the reflective member 10, the second walls 12 are connected to the first walls 11 to constitute a portion of the frame outside the first walls 11.

A region that is partially surrounded by or partially defined by the second walls 12 is referred to as the second region 12R or the third region 13R. The second region 12R and the third region 13R have a shape in which a portion of the shape of the first region 11R is absent in a plan view, as compared to a complete shape of the first region 11R. Particularly, the second region 12R has an area that is no smaller than half the area of the first region 11R surrounded by the first walls 11. The third region 13R has an area that is smaller than half the area of the first region 11R. In other words, the second region 12R has a region that corresponds to the center (or the center of gravity) of the first region 11R and that has an area no smaller than half the area of the first region 11R. Also in other words, the third region 13R does not have a region that corresponds to the center (or the center of gravity) of the first region 11R and that has an area that is smaller than half the area of the first region 11R. In still other words, the second region 12R has a region that corresponds to the center (or the center of gravity) of the first region 11R, while the third region 13R does not have a region that corresponds to the center (or the center of gravity) of the first region 11R.

The one or more second regions 12R and the one or more third regions 13R can have planer shapes that can be set as appropriate depending on a planer shape of the first region 11R, a planer shape of the reflective member 10, and display devices of instruments to which the light source device is installed, and the like. In the case in which the reflective member 10 includes a plurality of second regions 12R and a plurality of third regions 13R, the shape of the second and third regions can be the same or can be partially or fully different from each other. This allows the light source device to have an irregular shape that can fit the shape of instruments and, therefore the light source device can be downsized. As an examples of the shapes among various shapes, a region is formed by cutting the single first region 11R (defined by the first walls 11) at an appropriate portion along a line that is parallel to one of the sides (see N portions in FIGS. 1A, 3A through 3C).

As another example, a region is formed by cutting the single first region 11R (defined by the first walls 11) at an appropriate portion along a line that is inclined at an appropriate angle with respect to one of the sides (see J, W, L portions in FIGS. 1A, 3A through 3C).

As still another example, a region is formed by cutting the single first region 11R (defined by the first walls 11) along a line and a curve as appropriate (see K portions in FIGS. 1A, 3A through 3C).

As still another example, a region is formed by cutting the single first region (defined 11R by the first walls 11) along an appropriate curve.

The light source 9 is disposed in the second region 12R and not disposed in the third region 13R. As described above, if the second region 12R includes a region that corresponds to the center (or the center of gravity) of the first region 11R, the light source 9 is disposed at or near the region that corresponds to the center (or the center of gravity). In the case in which the second region 12R does not include a region that corresponds to the center (or the center of gravity) of the first region 11R but have an area no smaller than half the area of the first region 11R, the light source 9 cannot be disposed.

The third regions 13R, which is partially surrounded by the second walls 12 and does not include the light source 9, are disposed such that each third region 13R is not continued to each other in a vertical direction, a lateral direction, or an oblique direction (see J, W, K, N, L portions, etc. in FIGS. 1A, 3A through 3B) as seen in a plan of the figure. This configuration may inhibit to generate dark regions at an edge portion of the light source device in the case of using irregular shape of a reflective member, and effectively inhibit unevenness in luminance in the plane.

In a plan view, the reflective member 10 has a configuration in which the first walls 11 constitute parallel vertical sides or parallel lateral sides (see Q portions in FIGS. 1A, 3A through 3C), while the second walls 12, the second regions 12R or the third regions 13R constitute sides that are inclined or curved with respect to the vertical or lateral sides defined by the first walls 11 or the first region 11R (see J, W, K, N, L portions, etc. in FIGS. 1A, 3A through 3C). The inclination or curve herein can be appropriately set depending on the size and arrangement of the light source 9, the application in which the light source device is used, and the like. That is, if the outer periphery of the reflective member 10 has parallel sides in vertical and/or lateral directions (see Q portions in FIGS. 1A, 3A through 3C), the first walls 11 can be disposed to constitute the parallel sides, whereas the second walls 12 do not substantially constitute the sides at the outer periphery of the reflective member. The second regions 12R or the third regions 13R constitute the periphery of the reflective member 10 together with the first walls 11 (see J, W, K, N, L portions, etc. in FIGS. 1A, 3A through 3C).

The first walls 11 and the second walls 12 constitute boundaries of adjacent regions and are preferably inclined, widening upward of the light source 9 in a cross-sectional view. The angle of the walls ($\gamma$ in FIG. 1D) is, for example, in a range of 45 degrees to 75 degrees.

The upper end of the first walls 11 and the second walls 12 can be planar. However, at least two walls that surround adjacent regions preferably form a ridge shape. In other words, as shown in FIG. 1A, a vertical cross sectional shape of at least two walls configuring an apex is preferably an acute triangle, and more preferably an acute isosceles triangle. The acute angle, i.e., the angle at the apex (a in FIG. 1D) of the acute triangle or the acute isosceles triangle is preferably in a range of, for example, 30 degrees to 90 degrees. Employing this range of the angle can reduce a space and region that are occupied by the reflective member 10, and decrease a height of the reflective member 10, to thereby allowing the light source device to be compact and slim.

The first walls 11 and/or the second walls 12 have a width (M portion in FIG. 1D) that can be appropriately set by the angle $\alpha$ and the angle $\gamma$ of the first walls 11 and the second walls 12, and a height OD of the reflective member, which will be described later. This can downsize the light source device.

The first walls 11 and the second walls 12 can be formed into various shapes depending on the number and the position of the light sources 9 arranged on the substrate 8 in a plan view. As an example of the shape, three of the first regions 11R and/or the second regions 12R and/or the third regions 13R are disposed adjacent to one another and three apexes are positioned at one point (see FIG. 3C). As another example of a shape, four of the first regions 11R and/or the second regions 12R and/or the third regions 13R are disposed adjacent to one another and four apexes are positioned at one point as shown in FIG. 1A and other drawings. As still another example of a shape, six of the first regions 11R and/or the second regions 12R and/or the third regions 13R are disposed adjacent to one another and six apexes are collected at one point.

The first walls 11 and/or the second walls 12 have a pitch (P portion in FIG. 1B) that can be adjusted appropriately depending on a size and performance of the light source to be used, and the like of the intended light source device. For example, the pitch can be in a range of 1 mm to 50 mm, preferably 5 mm to 20 mm, more preferably 6 mm to 15 mm.

In addition, each of the reflective members 10 preferably has a bottom surface 10c. The bottom surface 10c has a through hole at a substantially center of the first region 11R. As shown in FIG. 1A and other drawings, the light source 9 is preferably disposed in the through hole. The through hole has a shape and a size in which the whole of the light source 9 is exposed, and preferably has an outer edge that is located only near the light source 9. Accordingly, light emitted from the light source can be reflected on the bottom surface 10c. This configuration may improve light extraction efficiency.

The height of the reflective member 10, that is, the height from a lower surface of the bottom surface 10c of the reflective member 10 to the apex of the first walls 11 and the second walls 12 (OD in FIG. 1D) is preferably 8 mm or lower, more preferably in a range of 1 mm to 4 mm for a light source device with reduced height. This can make a whole backlight unit including optical members such as a diffusion plate, which will be described later, have a relatively slim shape.

The reflective member 10 has a thickness in a range of, for example, 100 μm to 300 μm.

The reflective member 10 is preferably disposed on or above the substrate 8. The lower surface of the bottom surface 10c of the reflective member 10 is preferably fixed to the upper surface of the substrate 8. Particularly, the periphery of the through hole is preferably fixed by using a light-reflective adhesive member to inhibit light emitted by the light source 9 from being incident between the substrate 8 and the-reflective member 10. More preferably, the light-reflective adhesive member is disposed, for example, in a ring shape along the outer edge of the through hole. The adhesive member can include a double-sided tape, a hot-melt type adhesive sheet, and a resin adhesive such as thermosetting resin or thermoplastic resin. The adhesive member preferably has a high flame resistance. The reflective member 10 can be fixed on the substrate 8 using screws and the like.

The reflective member 10 has a light reflectivity, and effectively reflects light emitted from the light source 9 by the first walls 11, the second walls 12, and the bottom surface 10c. Particularly, in the case in which the first walls 11 and the second walls 12 are inclined as described above, the light emitted from the light source 9 is projected to the first walls 11 and the second walls 12 to be upwardly reflected. Also, even if non-lighting occurs in the adjacent first region 11R and/or the adjacent second region 12R, a contrast ratio can be increased, and light is more efficiently reflected upward.

The reflective member 10 can be formed of resins that contain reflective materials made of metal oxide particles such as titanium oxide, aluminum oxide, or silicon oxide. The reflective member 10 can also be formed such that a resin material that contains no reflective material is formed, and then, a reflective material or a reflective film is provided on the surface of the resin material. The reflective member 10 preferably has a reflectance that is set to 70% or more with respect to the light emitted from the light sources 9.

The reflective member 10 can be a rigid member, a flexible member, or can partially include at least one of these members. The reflective member 10 can be a planer member constituting a planer surface, a member constituting a curved surface and the like, or a member having a combination of these members.

The reflective member 10 can be formed by various methods such as molding methods using a mold and forming methods by photofabrication. Applicable molding methods using a mold include injection molding, extrusion molding, compression molding, vacuum forming, pressure forming, and press forming. For example, the reflective member 10 can be formed by vacuum forming using a reflective sheet made of PET and the like to integrally form the bottom surface 10c, the first walls 11, and the second walls 12.

Other Members

Figure 1D:
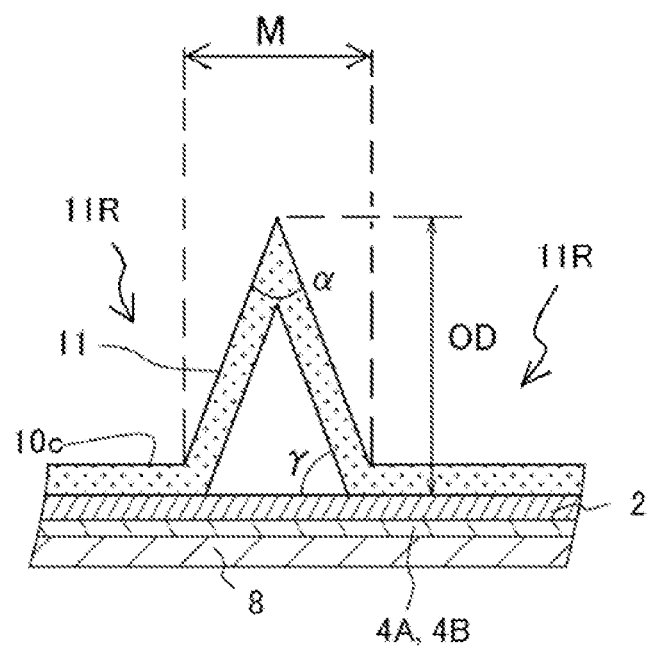
FIG. 1D is a schematic partial enlarged cross-sectional view around first walls in FIG. 1A.
Figure 1E:
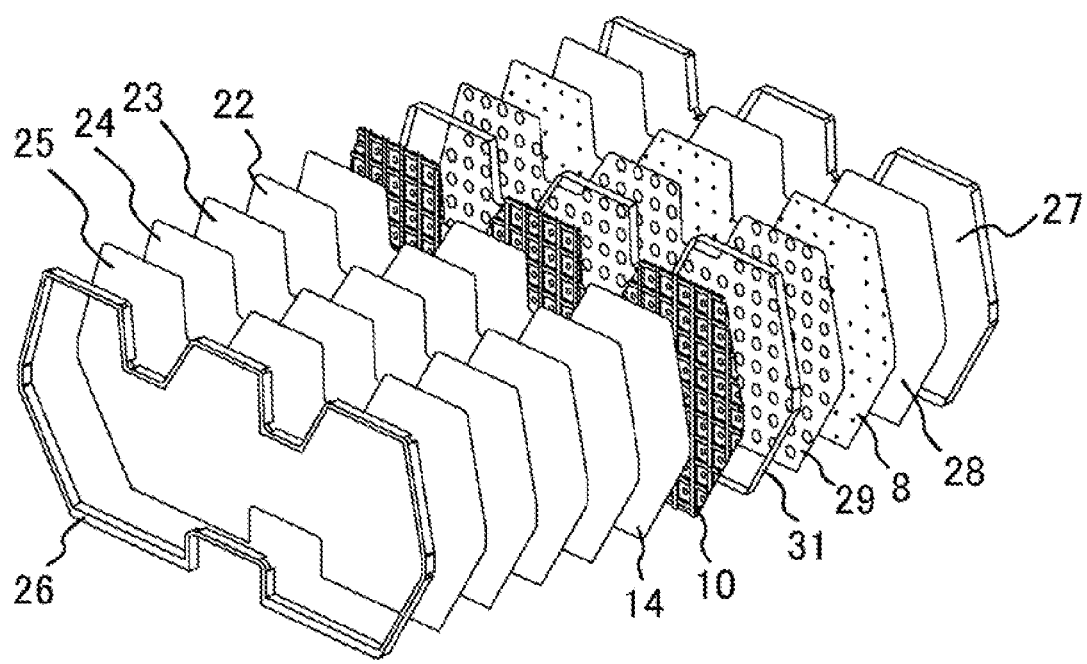
FIG. 1E is a schematic exploded perspective view of the light source device according to one embodiment of the present disclosure.
Figure 1F:
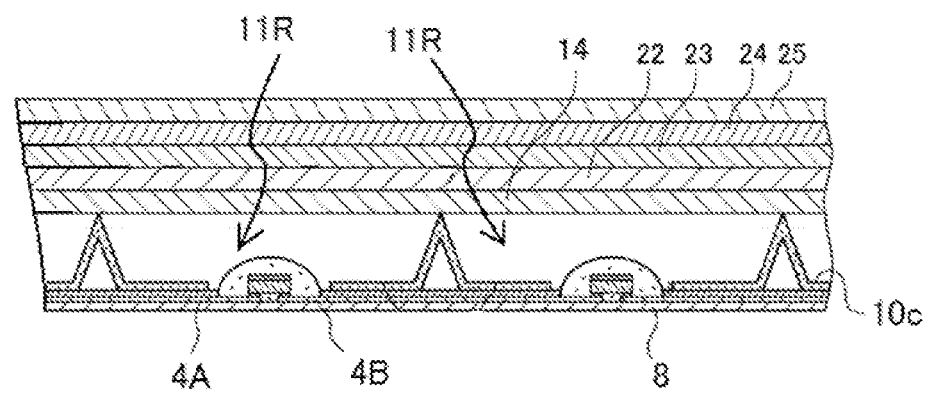
FIG. 1F is a schematic cross-sectional view showing a main part of the light source device including a portion of a member shown in FIG. 1E.

Further, the light source device according to the present embodiment preferably includes, as shown in FIGS. 1E and 1F, a diffusion plate 14 and/or a diffusion sheet 22, a wavelength conversion sheet 23, a prism sheet 24, a polarizing sheet 25, an exterior substrate 27 (an exterior substrate member) that has a reflective wall surrounding an outer periphery of the substrate, and a covering substrate 26 (a covering substrate member) that has a reflective wall surrounding an outer periphery of the reflective member. The above members can be appropriately layered via an adhesive layer and/or the reflective layers 28, 29, 31, and the like. In the case in which such a light source device is provided with a liquid crystal panel or the like further thereon to obtain a surface-emitting light source device that is used as a light source for a direct backlight device. The above optical members can be layered in an appropriate order.

Diffusion Plate 14 and/or Diffusion Sheet 22

The diffusion plate 14 and/or the diffusion sheet 22 (hereinafter both referred to simply as the diffusion plate 14) are a member to diffuse and transmit incident light. Preferably, a single diffusion plate 14 is disposed above the light sources 9. The diffusion plate 14 is preferably disposed such that the diffusion plate 14 is substantially in contact with the apex of the first walls 11 and the second walls 12. The diffusion plate 14 is preferably a planer board-like member and can have irregularities on a surface thereof. The diffusion plate 14 is preferably disposed substantially parallel to the substrate 8. The diffusion plate 14 can be constituted of a material that is less likely to absorb visible light, for example, a polycarbonate resin, a polystyrene resin, an acrylic resin, or a polyethylene resin. For diffusing incident light, the diffusion plate 14 can have irregularities on the surface, or a material having a refractive index different from the refractive index of the diffusion plate 14 can be dispersed in the diffusion plate 14.

The irregularities can have a size in a range of, for example, 0.01 mm to 0.1 mm.

The material having a refractive index different from the refractive index of the diffusion plate 14 can be selected from, for example, polycarbonate resins, and acrylic resins.

The diffusion plate 14 can have a thickness and degree of diffusion that are appropriately set. A commercially available component, such as a light diffusion sheet or a diffuser film can be used. For example, the diffusion plate 14 can have a thickness in a range of 1 mm to 2 mm.

Supposing that the first walls 11 and/or the second walls 12 of the reflective member 10 defines a pitch P, the diffusion plate 14 is preferably disposed such that a distance between the diffusion plate and the light source (i.e., a height OD) is preferably 0.3 P or lower, more preferably 0.25 P or lower. As shown in FIG. 1D, the height OD herein indicates from an outermost surface of the substrate 8 to the lower surface of the diffusion plate 14, in other words, from the outer most surface of the covering member 2, wiring layers 4A and 4B, or the like to the lower surface of the diffusion plate 14 when the substrate 8 includes such a member as the outermost surface. In another view, for example, as shown in FIG. 2A, the diffusion plate 14 is preferably disposed at a distance in a range of 1.5 mm to 5 mm, more preferably in a range of 2 mm to 3 mm, from the upper surface of the bottom surface 10c of the reflective member 10.

The diffusion plate 14 can have a reflective portion on the upper surface and/or the lower surface at a region above or preferably directly above the light source. The distance between the diffusion plate 14 and the light source 9 is the shortest at the region above the light source, particularly directly above the light source. Hence, luminance in this region is the highest. The shorter the distance between the diffusion plate 14 and the light source 9 is, the more unevenness in luminance appears between a region that does not include the light source 9 and the region that is directly above the light source 9. By disposing the reflective portion on a surface of the diffusion plate 14, a portion of light emitted from the light source 9 having high directivity is reflected back toward the light source 9. Hence, unevenness in luminance can be reduced.

The diffusion plate 14 can have another reflective portion on the upper surface and/or the lower surface at a region above or preferably directly above the apex of the first walls 11 and/or the second walls 12.

In the case of local dimming of the light sources 9, the apex of the first walls 11 and/or the second walls 12 serves as a border region between a non-lighting region and a lighting region. The reflective portion disposed at the border region can inhibit light leakage from the lighting region to the non-lighting region and can reflect light traveling to the non-lighting region upward the light source 9.

The reflective portion can be made of a material containing a light-reflective material. Examples of the materials include resins and/or organic solvents containing the light-reflective material. Examples of the light-reflective materials include metal oxide particles such as titanium oxide, aluminum oxide, or silicon oxide. The resins and the organic solvents can be appropriately selected according to the metal oxide particles to be used and required properties for light source devices to be manufactured. Among these resins, a light transmissive resin curable with light is preferably used, for example, a resin containing an acrylate resin or an epoxy resin as a main component.

The reflective portion can be formed into various predetermined shapes or patterns such as stripes or islands. The reflective portion can be formed by a known method in the art such as printing, ink-jetting, or spraying.

The reflective portion has a thickness in a range of, for example, 10 μm to 100 μm.

Wavelength Conversion Sheet 23

The wavelength conversion sheet 23 can be disposed facing either the upper surface or the lower surface of the diffusion plate 14, however, as shown in FIGS. 1E and 1F, preferably facing the upper surface of the diffusion plate 14 and/or the diffusion sheet 22. The wavelength conversion sheet 23 absorbs a portion of light emitted from the light source 9 to emit light having a different wavelength from the light emitted from the light source 9. For example, the wavelength conversion sheet 23 absorbs a portion of blue light emitted from the light source 9 to emit yellow, green, and/or red lights that are mixed to form white light. Hence, a light source device that emits white light can be obtained. The wavelength conversion sheet 23 is spaced apart from a light-emitting element of the light source 9. This configuration allows for use of phosphors and the like having low heat or low light resistance, which may be difficult to use near the light-emitting element. This may increase performance of the light source device as a backlight. The wavelength conversion sheet 23 has a sheet-like shape or a layered shape and contains the above-mentioned phosphors and the like.

Prism Sheet 24

The prism sheet 24 has a surface on which prisms are elongated along a predetermined direction. For example, assuming the prism sheet 24 is two-dimensional having an x axis and a y axis perpendicular to the x axis, the prism sheet 24 can be configured by layering a sheet having prisms elongated along the x axis and a sheet having prisms elongated along the y axis. The prism sheet can refract light incident from various directions toward the display panel that faces the light source device. This allows light emitted from the light-emitting surface of the light source device to travel mainly in a direction perpendicular to an upper surface, and increases luminance viewed from a front face of the light source device.

Polarizing Sheet 25

The polarizing sheet 25 selectively transmits light polarized in a polarization direction that matches a polarization direction of a polarizer disposed at the backlight side of a display panel such as a liquid crystal display panel, and reflects the light polarized in a direction perpendicular to the polarization direction toward the prism sheet 24. A portion of the polarized light returning back from the polarizing sheet 25 is reflected again by the prism sheet 24, the wavelength conversion sheet 23, and the diffusion plate 14. At this time, the polarization direction of the portion of the light changes, for example, the portion of the light is polarized in the polarization direction of the polarizer of the liquid crystal display panel, is incident on the polarizing sheet 25 again, and is emitted to the display panel. Accordingly, a polarization direction of light emitted from the light source device is aligned and light polarized in a direction effective for increasing luminance of the display panel can be emitted with high efficiency. Commercially available optical members for use in a backlight can be used for the polarizing sheet 25, the prism sheet 24, and the like.

Covering Substrate 26 and/or Exterior Substrate 27, Adhesive Layer and/or Reflective Layers 28, 29, and 31

The covering substrate 26 has the reflective wall surrounding the outer periphery of the reflective member 10 and covers the optical members such as the reflective member 10 and the above-mentioned diffusion plate 14 by fixing or supporting the upper outer edges of these optical members.

The exterior substrate 27 has the reflective wall surrounding the outer periphery of the substrate 8 and covers from a rear surface of the substrate 8.

By bringing in contact with or engaging the reflective walls of the covering substrate 26 and the exterior substrate 27 each other, light emitted from the light-emitting device is inhibited from leaking out of the reflective walls, that is, inhibited from leaking out of the light source device. This may improve luminance on the light-emitting surface.

The covering substrate 26 and the exterior substrate 27 can be made of materials that can reflect light emitted from the light-emitting device, such as resins containing a light-reflective material, metals, or ceramics.

The adhesive layer and the reflective layer can be made of materials that can bond upper and lower members and can reflect direct light or indirect light emitted from the light-emitting device. For example, a double-sided tape, a hot-melt type adhesive sheet, and a resin adhesive such as thermosetting resin or thermoplastic resin, can be used.

The light source devices according to the present disclosure are applicable to various light source devices such as a light source of the backlight of display devices, a lighting device, a light source of in-vehicle instruments.

The invention claimed is:

1. A light source device comprising:
a plurality of light sources;
a substrate on which the light sources are arranged; and
a reflective member arranged on the substrate via an adhesive member, the reflective member defining a plurality of through holes, the reflective member including
first walls defining a first region surrounded by the first walls in a plan view, and
second walls located on an outer side of the first walls and defining a second region having an opening facing outside of the reflective member in the plan view, an area of the second region being smaller than an area of the first region, wherein the light sources are respectively disposed inside the through holes in a plan view, and the adhesive member is light-reflective.

2. The light source device according to claim 1, wherein the adhesive member is arranged in a periphery of each of the through holes.

3. The light source device according to claim 1, wherein the adhesive member includes a double-sided tape, an adhesive sheet, or a resin adhesive.

4. The light source device according to claim 1, wherein the reflective member is made of polyethylene terephthalate.

5. The light source device according to claim 1, further comprising at least one member selected from a group consisting of
a diffusion plate,
a diffusion sheet,
a wavelength conversion sheet configured to convert light emitted from at least one of the light sources to light having a different wavelength,
a prism sheet, and
a polarizing sheet.

6. The light source device according to claim 1, wherein each of the light sources includes a light-emitting element.

7. The light source device according to claim 1, wherein each of the light sources includes a light-emitting element and a light-transmissive encapsulating member covering the light-emitting element.

8. The light source device according to claim 6, wherein each of the light sources further includes a light-reflective film arranged on an upper surface of the light-emitting element.

9. The light source device according to claim 7, wherein each of the light sources further includes a light-reflective film arranged on an upper surface of the light-emitting element.

10. The light source device according to claim 1, wherein the substrate includes a wiring layer electrically connected to the light sources.

11. The light source device according to claim 1, wherein the first walls and the second walls are spaced apart from the through holes.

* * * * *